United States Patent
Robinson (10) Patent No.: US 7,873,166 B2
(45) Date of Patent: Jan. 18, 2011

(54) METHOD FOR UNDETECTABLY IMPEDING KEY STRENGTH OF ENCRYPTION USAGE FOR PRODUCTS EXPORTED OUTSIDE THE U.S

(75) Inventor: Richard L. Robinson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1054 days.

(21) Appl. No.: 11/226,122

(22) Filed: Sep. 13, 2005

(65) Prior Publication Data

US 2007/0058814 A1   Mar. 15, 2007

(51) Int. Cl.
*H04L 9/00* (2006.01)
(52) U.S. Cl. .......................... 380/277; 380/286; 380/44
(58) Field of Classification Search ........................ None
See application file for complete search history.

(56) References Cited

U.S. PATENT DOCUMENTS

| | | | |
|---|---|---|---|
| 4,850,017 A * | 7/1989 | Matyas et al. ................ 380/280 |
| 5,323,464 A | 6/1994 | Elander et al. | |
| 5,416,841 A | 5/1995 | Merrick | |
| 5,764,772 A | 6/1998 | Kaufman et al. | |
| 5,815,573 A | 9/1998 | Johnson et al. | |
| 5,850,443 A | 12/1998 | Van Oorschot et al. | |
| 5,912,973 A | 6/1999 | Hiramatsu et al. | |
| 5,949,883 A | 9/1999 | Ford | |
| 6,125,446 A | 9/2000 | Olarig et al. | |
| 6,307,936 B1 | 10/2001 | Ober et al. | |
| 6,363,480 B1 | 3/2002 | Perlman | |
| 6,424,713 B1 | 7/2002 | Sprunk | |
| 6,891,950 B1 | 5/2005 | Oomori et al. | |
| 6,937,727 B2 | 8/2005 | Yup et al. | |
| 6,947,560 B1 | 9/2005 | Smeets et al. | |
| 7,174,020 B2 | 2/2007 | Chui | |
| 7,194,090 B2 | 3/2007 | Muratani et al. | |
| 7,195,173 B2 | 3/2007 | Powell et al. | |
| 7,212,633 B2 | 5/2007 | Yokota et | |
| 7,218,733 B2 | 5/2007 | Li et al. | |
| 7,272,500 B1 | 9/2007 | Walker | |
| 2002/0061107 A1 | 5/2002 | Tham et al. | |

(Continued)

FOREIGN PATENT DOCUMENTS

EP   0592808 A2   4/1994

(Continued)

OTHER PUBLICATIONS

David J. Kappos, "Subject Matter Eligibility of Computer Readable Media", Jan. 26, 2010, 1 page.*

(Continued)

*Primary Examiner*—Ponnoreay Pich
(74) *Attorney, Agent, or Firm*—Sheridan Ross P.C.

(57) ABSTRACT

In one embodiment, a communication device includes a key strength controlling agent 308 operable to (i) receive a request for a cryptographic key; (ii) determine, from a restriction identifier, whether the cryptographic key strength is restricted; (iii) when the cryptographic key is restricted, cause the use of a second cryptographic key having a second key strength; and (iv) when the cryptographic key is not restricted, cause the use of a first cryptographic key having a first key strength. The first and second key strengths are different.

19 Claims, 3 Drawing Sheets

U.S. PATENT DOCUMENTS

| | | |
|---|---|---|
| 2002/0106080 A1 | 8/2002 | Qi et al. |
| 2002/0118828 A1 | 8/2002 | Yoshimura et al. |
| 2003/0039355 A1 | 2/2003 | McCanny et al. |
| 2003/0072444 A1 | 4/2003 | Hu et al. |
| 2003/0084332 A1 | 5/2003 | Krasinski et al. |
| 2003/0198345 A1 | 10/2003 | Van Buer |
| 2004/0202318 A1 | 10/2004 | Lu |
| 2004/0260950 A1 | 12/2004 | Ougi et al. |
| 2005/0141716 A1 | 6/2005 | Kumar et al. |
| 2005/0157879 A1 | 7/2005 | Tanaka et al. |
| 2005/0213756 A1 | 9/2005 | Hubert |
| 2006/0009238 A1 | 1/2006 | Stanco et al. |
| 2006/0034456 A1 | 2/2006 | McGough |
| 2006/0204005 A1 | 9/2006 | Hassan et al. |

FOREIGN PATENT DOCUMENTS

| | | |
|---|---|---|
| EP | 0729252 | 8/1996 |
| EP | 982895 | 3/2000 |
| EP | 01351430 | 10/2003 |
| GB | 2329308 A | 3/1999 |
| JP | 6-202558 | 7/1994 |
| JP | 10-28114 | 1/1998 |
| JP | 11-161486 | 6/1999 |
| JP | 2002-16594 | 1/2002 |
| JP | 2002-503007 | 1/2002 |
| KR | 2002-61115 | 7/2002 |
| WO | WO 99/40549 | 8/1999 |
| WO | WO 02/37222 A2 | 5/2002 |

OTHER PUBLICATIONS

Notice of Preliminary Rejection for Korean Patent Application No. 2006-0088689.
Official Action for U.S. Appl. No. 11/395,887, mailed Jan. 9, 2008.
European Search Report for European counterpart application, Application No. 06254606.4.
U.S. Appl. No. 11/395,877, filed Mar. 31, 2006, Gilman.
Alfred J. Menezes et al., Hand Book of Applied Cryptography, 1997, CRC Press LLC.
Bruce Scheiner, The Blowfish Encryption Algorithm—One Year Later, Sep. 1995, Dr. Dobb's Journal.
FIPS, Announcing the Advance Encryption Standard (AES), Nov. 26, 2001, Publication 197.
Mikey: Multimedia Internet KEYing, Arkko et al., The Internet Society, Aug. 2004, 60 pages.
Neal R. Wagner, The Laws of Cryptography with Java Code, 2003 pp. 131-307.
The Secure Real-time Transport Protocol (SRTP), Baugher et al., The Internet Society, Mar. 2004, 56 pages.
Official Action for U.S. Appl. No. 11/395,887, mailed Jan. 4, 2007.
Official Action for U.S. Appl. No. 11/395,887, mailed Jun. 20, 2007.
Translation of Notice of Preliminary Rejection for Korean Patent Application No. 2006-0088689, dated May 19, 2008.
Avaya—"SG200 Security Gateway—Product Features", at http://www.avaya.com/gcm/master-usa/en-us/products/offers/sg200.htm &View=ProdFeat...., Copyright 2005, 2 pages.
Avaya—"SG200 Security Gateway—Product Description", at http://www.avaya.com/gcm/master-usa/en-us/products/offers/sg200.htm &View=ProdDesc...., Copyright 2005, 2 pages.
Avaya—"SG200 Security Gateway—Prod Overview", at http://www.avaya.com/gcm/master-usa/en-us/products/offers/sg200.htm, Copyright 2005, 2 pages.
Avaya—"VPNmanager Series—Product Features", at http://www.avaya.com/gcm/master-usa/en-us/products/offers/vpnmanager.htm &View=Pro..., Copyright 2005, 2 pages.
Avaya—"VPNmanager Series—Product Description", at http://www.avaya.com/gcm/master-usa/en-us/products/offers/vpnmanager.htm&View=Pro..., Copyright 2005, 2 pages.
Avaya—"VPNmanager Series—Prod Overview", at http://www.avaya.com/gcm/master-usa/en-us/products/offers/vpnmanager.htm, Copyright 2005, 2 pages.
U.S. Bureau of Industry and Security—Encryption—"Commercial Encryption Export Controls", at http://www.bxa.doc.gov/encryption/default.htm, Fact Sheet Dec. 9, 2004, 2 pages.
U.S. Bureau of Industry and Security—Encryption Fact Sheet Jun. 17, 2002 —"Commercial Encryption Export Controls", at http://www.bxa.doc.gov/encryption/EncFactSheet12 09 04.htm, dated Dec. 9, 2004, 2 pages.
U.S. Bureau of Industry and Security—Export Control Basics (Exporting 101)—"Introduction to Commerce Department Expert Controls", at http://www.bxa.doc.gov/Licensing/Exporting Basics.htm, updated May 8, 2003, 8 pages.
Official Action for U.S. Appl. No. 11/395,877, mailed Aug. 21, 2008.
Japanese Patent Application No. 2006-247807, mailed Nov. 17, 2008.
Official Action for U.S. Appl. No. 11/395,877, mailed Dec. 23, 2008.
Notification of First Office Action (including translation) for Chinese Patent Application No. 200610153931.0, date of notification Mar. 27, 2009.
Notice of Preliminary Rejection (including translation) for Korean Patent Application No. 2006-0088689, dated Feb. 10, 2009.
BEA WebLogic Server and WebLogic Express Installation Guide, Release 8.1 Beta, BEA Systems, Inc., 2002, 5 pages.
Configuring Avaya Communication Manager for Media Encryption—Issue 1.0, Avaya Inc., 2004, 3 pages.
Official Action for Canadian Patent Application No. 2,558,227, mailed Jan. 13, 2010.
Japanese Patent Application No. 2006-247807, mailed Feb. 18, 2010.

\* cited by examiner

METHOD FOR UNDETECTABLY IMPEDING KEY STRENGTH OF ENCRYPTION USAGE FOR PRODUCTS EXPORTED OUTSIDE THE U.S

FIELD OF THE INVENTION

The invention relates generally to encryption and particularly to weakening encryption strength.

BACKGROUND OF THE INVENTION

The increasing use of the Internet is making security a primary concern of Internet users. To provide security, Virtual Private Networks (VPNs) have been developed. A VPN is an IP connection between two sites over the public IP network that has its payload traffic encrypted so that only the source and destination can decrypt the traffic packets. VPNs encrypt not only payload but also the protocol stack informational items, which may be used to compromise a customer site in a technical session attack profile.

A large number of VPN protocols have been developed. The Point-to-Point Tunneling Protocol (PPTP) provides encryption and authentication for remote dial-up and LAN-to-LAN connections, uses a control session to establish and maintain a secure tunnel from sender to receiver, and uses a data session to provide data transmission. The Layer 2 Forward protocol (L2F) provides tunneling between an Internet Service Provider's (ISP) dial-up server and the network. The user establishes a dial-up Point-to-Point Protocol (PPP) connection to the ISP's server, which then wraps the PPP frames inside an L2F frame for routing over the network. The Layer 2 Tunneling Protocol defines a method for tunneling PPP sessions across a network. It combines both PPTP and L2F. IP Security or IPSec is a suite of protocols that includes an Authentication Header (AH), an Encapsulating Security Payload (ESP), and the Internet Key Exchange (IKE). Operating at Layer 3, IPSec provides address authentication via AH, data encryption via ESP, and automated key exchanges between sender and receiver nodes using IKE. Other VPN protocols include Secure Real Time Protocol (SRTP), Transport LAN Service (TLS), and Secure Socket Layer or SSL protocol.

Figure 1:
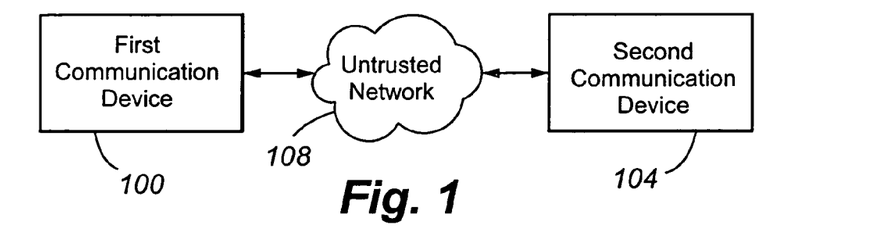
FIG. 1 is a block diagram of a VPN communication according to the prior art.
Figure 2:
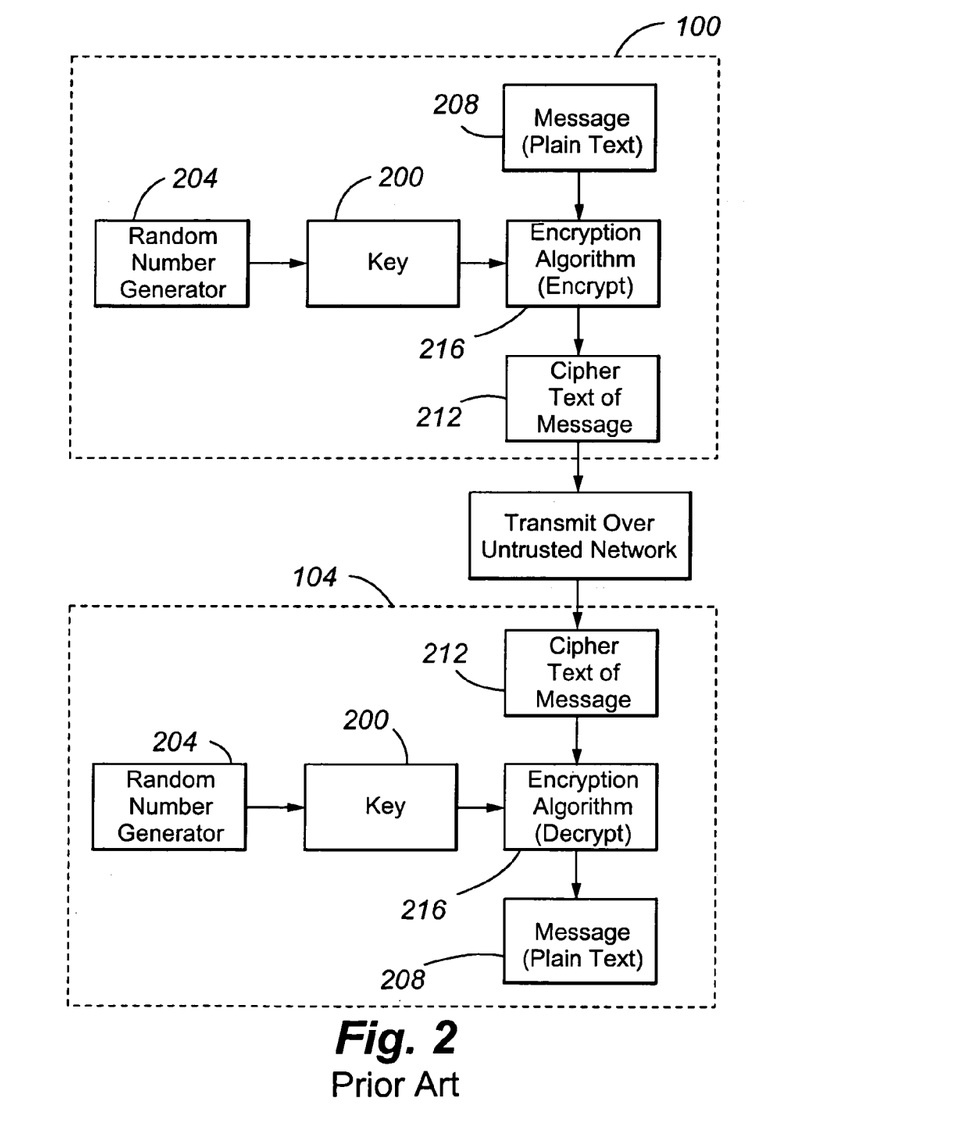
FIG. 2 is a block diagram of an encryption/decryption process according to the prior art.

An exemplary IPSec session will be discussed with reference to FIGS. 1 and 2. First and second communication devices 100 and 104, such as IP hardphones, softphones, Personal Computers (PCs), laptops, and Personal Digital Assistants (PDAs), are connected via the untrusted or insecure network 108 (such as the Internet). The communication devices seek to establish a secured session and must perform a key exchange. As will be appreciated, keys 200 are produced by a random number generator 204. The keys 200 are used by each of the first and second communication devices to encrypt and decrypt and authenticate plain and cipher text 208 and 212, respectively. In symmetrical encryption, encryption and decryption are performed by inputting identical keys 200 into the same encryption algorithm 216 at each of the session nodes.

To exchange keys, the IKE protocol uses the Diffie-Hellman encryption algorithm for key generation and provides three different methods of key exchange, namely main mode, aggressive mode, and quick mode. In main mode, six messages (three back-and-forth exchanges) are sent between the nodes. The first two message establish a specific security policy, the next two messages contain key information, and the last two messages provide authentication information. Aggressive mode is similar to main mode and achieves the same result. The difference is that there are only two exchanges (four messages sent between sender and receiver) instead of three. Quick mode is used to generate new keys after all necessary information has been exchanged between the communicating nodes via main or aggressive modes.

Many countries, such as the U.S., place strict export controls on cryptography technology and products for reasons of national security. In the U.S., export controls on commercial encryption products are administered by the Bureau of Industry and Security in the U.S. Department of Commerce, as authorized by the Export Administration Regulations or EAR, and by the Office of Defense Trade Controls (DTC) in the State Department, as authorized by the Information Technology Administration Regulations or ITAR. Historically, strict controls have been placed on granting export licenses for encryption products stronger than a certain level. Other countries have similar regulations.

An ongoing challenge for companies selling cryptographically enabled products internationally is controlling the strength of the encryption product effectively. For such products sold in the U.S., encryption strength is much more loosely controlled than for such products sold in other countries, particularly certain strictly export controlled countries, such as Iran, Cuba, and North Korea.

One approach to controlling encryption strength is to vary the encryption algorithm based upon product destination. This is done using a license file. By way of illustration, a license file utility controls whether or not the device supports first or second encryption algorithms of differing strengths. Examples of weaker encryption algorithms include the Data Encryption Standard-56 (DES) and of stronger encryption algorithms include Triple or Three DES and Advanced Encryption Standard or AES. As will be appreciated, DES is much weaker than Triple DES. A flag is set or unset in the license file when the device is not to support the stronger encryption algorithm. During a license check and/or session negotiation, the license utility will deactivate the stronger encryption algorithm and activate the weaker encryption algorithm when the flag indicates that the device is not to support the stronger encryption algorithm and activate the stronger encryption algorithm and deactivate the weaker encryption algorithm when the flag indicates that the device is to support the stronger encryption algorithm.

In another approach that has been implemented by web browser and server vendors (e.g., Netscape™, Microsoft™, etc.), an application is not allowed to negotiate strong keys of long key lengths and associated cipher suites (encryption algorithms), unless the web server, web browser, and web browser certificate are of a version, type, and strength to allow for strong cipher suites and key sizes to be used. Otherwise, weak keys of short key lengths and associated cipher suites are used.

Problems with these approaches include the transparency, to a sophisticated user, of the activation of the weaker encryption algorithm. Based on this knowledge, sophisticated users may attempt to alter the license file to activate the stronger encryption algorithm. This transparency is particularly a problem where the user can view freely the certificate and determine if the software version is such that encryption is restricted.

Another problem is that the software vendor needs to manage two software packages depending upon whether the product is to be exported or remain in the country of manufacture. The vendor thus must ensure that the package having a higher encryption strength does not leave the country of manufacture.

SUMMARY OF THE INVENTION

These and other needs are addressed by the various embodiments and configurations of the present invention. The present invention is directed generally to the variation of key strength, in addition to or in lieu of encryption algorithm variation, to lower encryption strength, particularly for products to be exported.

In a first embodiment, the present invention is directed to a method for providing a cryptographic key that includes the steps of:
(a) receiving a request for a cryptographic key;
(b) determining, from a restriction identifier, whether the cryptographic key strength is restricted;
(c) when the cryptographic key is restricted, using a second cryptographic key having a second key strength; and
(d) when the cryptographic key is not restricted, using a first cryptographic key having a first key strength. The first key strength is higher than the second key strength.

The second key is preferably derived from the first key. Typically, the first key is generated by a random number generator. The second key is a handicapped or compromised version of the first key. Some of the bits in the first key are the same as the corresponding bits in the second key while others are different. The differing bits are commonly maintained constant from key-to-key and/or are generated using a mask.

Handicapping of the second key may also be done by decreasing the degree of randomness of all or some of the bits of the generated key. In other words, the degree of randomness of the random number generator is controlled or handicapped so that the number of possible variations for a given key is less than the theoretical number of possible variations. Thus, the possible variations for a 16-bit key is less than $2^{16}$ and preferably less than 50% of the number of possible variations.

In either case, the use of weakened keys inherently weakens the cryptographic strength of the cipher suite regardless of the specific cipher suite used. As such concerns over export are largely eliminated. By locating the restriction identifier in a protected license file, the end user has no idea if the keys for a particular session are strong or weak. Embedding the restriction identifier in the license file can also obviate the need for the vendor to manage multiple versions of the software and/or different types of certificates.

It is further preferred that the first and second keys have the same key sizes (e.g., key lengths). Although it is possible to use only part of the first key in the second key or for the second key to be a shortened or truncated version of the first key, for purposes of simplicity the first and second keys should have the same number of bits, though their effective key strengths may differ.

In one configuration, the restriction identifier is a software flag located somewhere in the communication device. The flag causes the masking of keys (the first keys) generated for an encrypted session so that the session keys (the second keys) are relatively weak (e.g., 40 bits). Known, fixed keys could also be used unless the software flag is set (or unset). The configuration can be extended to allow the license file to control the flag so that different levels of strength could be offered (e.g., 56-bit, 80-bit, 90-bit, etc.) as well as different methods of masking the key.

Unlike the prior art, the same cipher suite or encryption algorithm is preferably used for the first and second keys. Even a relatively strong cipher suite, such as Triple DES, can be substantially weakened by use of the second key.

The present invention can provide a simple and effective way to comply with pertinent product export regulations while permitting the government to access the data encrypted using the second key. By "cracking" the key and knowing the cipher suite used, the government can decrypt easily the data in electronic messages.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 3:
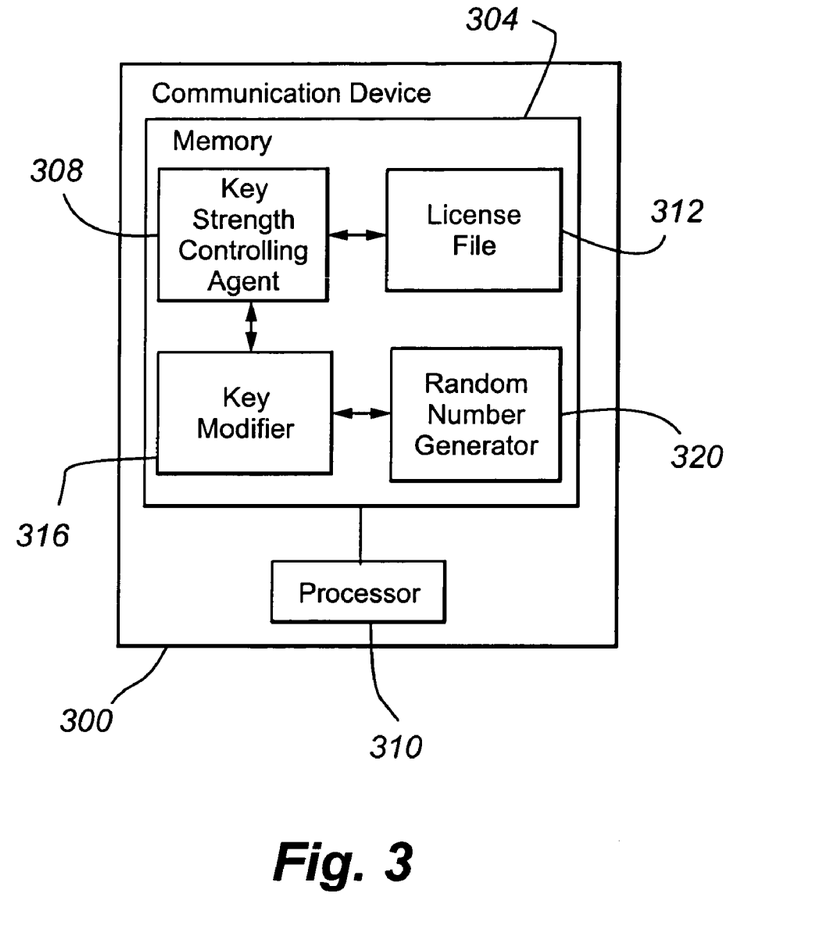
FIG. 3 is a block diagram of a communication device according to an embodiment of the present invention.
Figure 4:
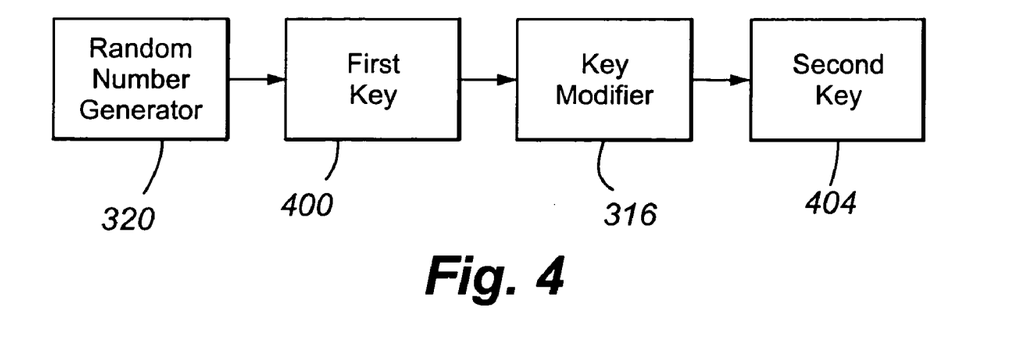
FIG. 4 is a block diagram of a key modification architecture according to an embodiment of the present invention.

A first embodiment of the present invention will be described with reference to FIGS. 3-4. A communication device 300 according to the present invention includes a memory 304 and processor 310. The communication device can be any of a number of packet-switched devices, including without limitation Personal Computer (PC), laptop, Personal Digital Assistant (PDA), IP hardphone, IP softphone, wireless phone, cellular phone, instant messaging software, and networking equipment. Memory 304 can be volatile, nonvolatile, or a combination thereof. Although any memory configuration may be employed, the preferred configuration is a hard disk drive. The processor 308 is preferably a microprocessor, a microcontroller, or a digital signal processor.

Included in memory 304 are a key strength controlling agent 308, a license file 312, a key modifier 316, and a random number generator 320. The key strength controlling agent 312, in response to a data structure in the license file 312 (which contains license permissions and restrictions such as enabled features, disabled-features, license duration, hardware identifiers for which the license is valid, and the like), invokes the key modifier 316 to provide a second key 404 having a second effective key strength. When the key modifier 316 is not invoked in response to the data structure, a first key 400 is outputted by the random number generator 320 having a first effective key strength. The second effective key strength is less than, and more preferably no more than about 50% of, the first effective key strength. In a preferred configuration, the actual lengths of the first and second keys are the same but their effective key lengths are different.

As will be appreciated, "key strength" refers to a number of possible combinations or keys. Key strength is commonly a function of key length. For example, the key strength for a 16-bit key is $2^{16}$, a 32-bit key is $2^{32}$, a 64-bit key is $2^{64}$ and a 128-bit key is $2^{128}$. By using a weaker key strength, the effective cryptographic strength of encryption using the first key is less than that using the second key. The first key is used, for example, in non-export-restricted products, and the second key is used in export-restricted products.

The same encryption algorithm is commonly used for both the first and second keys. Any encryption algorithm, whether using symmetric or asymmetric keys, can be used. Examples of suitable encryption algorithms include AES, Federal Information Protocol Standard 197, DES, three DES, RC4, Rivest Shamir and Adelman (RSA), Diffie-Hellman, Digital Signal Algorithm or DSA, Lucifer, Madryga, NewDES, FEAL, REDOC, LOKI, Khufu and Khafre, RC2, IDEA, MMB, CA-1.1, Skipjack, GOST, CAST, Blowfish, SAFER, 3-Way, Crab, SXAL8/MBAL, RC5, knapsack algorithms, Pohlig-Hellman, Rabin, ElGamal, McEliece, Elliptic Curve Cryptosystems, LUC, finite automation public-key cryptosystems, DSA variants, discrete logarithm signature schemes, Ong-Schnorr-Shamir, ESIGN, cellular automata, and the like. In asymmetric key applications, the first and second keys commonly refer to the private key and not the public key of a party, since the public key is derived from the private key.

The key strength controlling agent 308 checks the license file 312 during periodic license checks and in response to session negotiation requests when two nodes are establishing secured session parameters, including encryption protocols and keys.

The data structure is typically a type of use restriction identifier that identifies a level of use restrictions from a governmental or other entity. The restriction identifier may identify only one level or multiple levels of usage restrictions. Each usage level restriction would have a corresponding second key strength, with the second key strengths being different from one another; that is, the highest or strictest level of restriction would have a key strength that is lower than the lowest or most lenient level of restriction.

In one configuration, the data structure in the license file 312 can be any indicator, such as a flag. It may be set to a value of 1, for example, when export controls apply and set to a value of 0 when export controls do not apply or vice versa.

In another configuration, the data structure is a country code identifying a country to which the product is being exported. Each country has a unique identifying code. This configuration permits the use of levels or tiers of key strengths depending on the countries of export. This configuration further allows post-sale key strength modifications to reflect changes in pertinent export laws and regulations. For example, such modifications may be needed when a country is taken off or added to the list of countries subject to the most restrictive export controls.

In another configuration, the data structure includes pseudo- or machine code indicating how to modify the first key to produce the second key. Multiple data structures would correspond to multiple different techniques to manipulate or modify the first key, with each technique producing a corresponding second key strength that is different from the second key strengths produced by the other techniques.

In one configuration, a Global Positioning System or GPS module (not shown) provides geographic location information (or GPS signals or GPS coordinates) to the key strength controlling agent 308. The GPS coordinates can be mapped to a table of GPS coordinates to determine a country in which the device 300 is located and/or whether the device 300 is currently located in a use-restricted geographic area. When the device is moved to a restricted country or geographic area, the GPS location signals cause the key strength controlling agent 308 to change automatically, and without changes to the data structure, the effective key strength. The GPS module may be located within the device or in an external dongle or other device that plugs into the device. In the latter configuration, the device is inoperable unless the module is plugged in. This configuration prevents unlawful post-sale transportation of the device to a restricted country. A suitable GPS-location architecture is disclosed in U.S. patent application Ser. No. 10/811,412, filed Mar. 25, 2004, entitled "GPS Hardware Key for Software Licensing", to Walker, which is incorporated herein by this reference.

The key modifier 316, in a preferred configuration, alters the first key outputted by the random number generator to form the second key. The random number generator 320 is preferably a random source or a cryptographically secure pseudo-random-bit generator. Example generators include linear congruential generators, Feedback Shift Registers (e.g., linear and nonlinear FSRs, feedback carry shift registers, etc.), A5 algorithm, Hughes XPD/KPD algorithm, Nanoteq algorithm, Rambutan algorithm, additive generators, Gifford stream cipher, Algorithm M, PDZIP algorithm, RC4 algorithm, SEAL algorithm, WAKE algorithm, RAND tables, and random noise generators.

The modification may be effected in a number of differing ways.

In one way, only specific characters in the first key may be used in the second key, with the remaining characters being set collectively to the same value or individually to predetermined or constant values. For example, in a randomly or pseudo-randomly selected 168-bit key, the first and last 56 bits are altered to be identical with the middle 56 bits being randomly or pseudo-randomly selected. In the example, the effective key strength of the first key is $2^{168}$ while that of the second key is $2^{112}$. In another example, only the last 20 bits of a randomly or pseudo-randomly selected 64-bit key are randomly or pseudo-randomly selected. The effective key strength of the second key is $2^{20}$. In another example, the first 100 bits of a randomly or pseudo-randomly selected 168-bit key are set to the same value, such as one or zero. The effective key strength of the second key is $2^{68}$.

Figure 5:
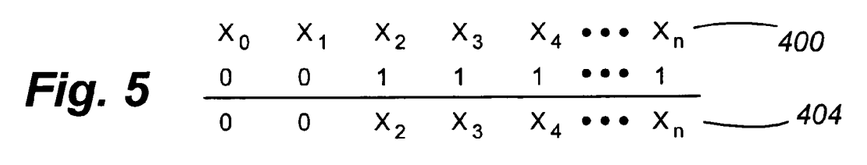
FIG. 5 depicts a mask according to an embodiment of the present invention.
Figure 6:
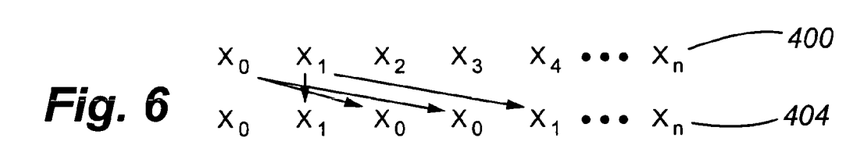
FIG. 6 depicts a mask according to an embodiment of the present invention.
Figure 7:
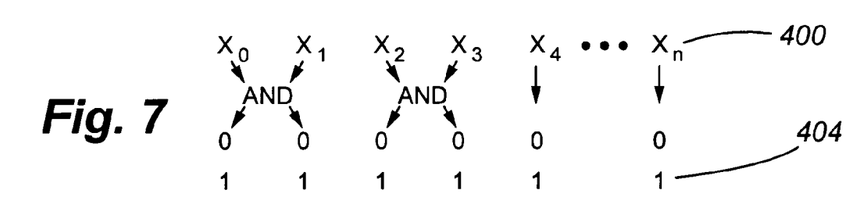
FIG. 7 depicts a mask according to an embodiment of the present invention.

In another way, a mask is applied to the first key to alter values in the second key in a selected sequence or pattern. Masking may be done in a number of ways. A first masking technique is shown in FIG. 5, which uses an n-bit key. The first key 400 includes bits $X_0, X_1, X_2, X_3, \ldots X_n$. A logical (Boolean) operation is used whereby all of the bits that are to be controlled and subjected to the AND operation with zeros. For example, when $X_0$ and the corresponding position 500 in the Boolean logic are both "1" the corresponding bit position 504 in the second key is "1". When either or both of $X_0$ and the corresponding position 500 in the Boolean logic are "0" (as shown) the corresponding bit position 504 in the second key is "0". As can be seen from FIG. 5, the corresponding bit position 504 in the second key will always be "0". This operation is applied to the first and second bit positions $X_0$ and $X_1$ but not to the other bit positions $X_2, X_3, \ldots X_n$. The effective second key strength is thus $2^{n-2}$. Another masking technique is shown in FIG. 6. As can be seen from FIG. 6, certain bits in the first key 400, namely $X_0$ and $X_1$, are substituted, in a selected pattern, for bit positions in the second key 404. Thus, $X_0$ is substituted for the first, third, and fourth bit positions in the second key, and $X_1$ is substituted for the second and fifth bit positions in the second key. The second key strength is thus $2^{n-3}$. Another masking technique is shown in FIG. 7. As can be seen from FIG. 7, the values for $X_0$ and $X_1$ and $X_2$ and $X_3$ are subjected to the AND operation. Thus, when either or both members of the first pair of key bits ($X_0$ and $X_1$) and when either or both members of the second pair of key bits ($X_2$ and $X_3$) are zero, the values for each member of the appropriate pair is "0", and when both members of the first pair of key bits ($X_0$ and $X_1$) and when both members of the second pair of key bits ($X_2$ and $X_3$) are one, the values for each member of the appropriate pair is "1". This operation has effectively converted four possible combinations for each key pair (i.e., (0,0), (0,1), (1,0), and (1,1)) into only two possible combinations, namely (0,0) and (1,1). As will be appreciated, other masking operations may be envisioned by one of ordinary skill in the art.

Figure 8:
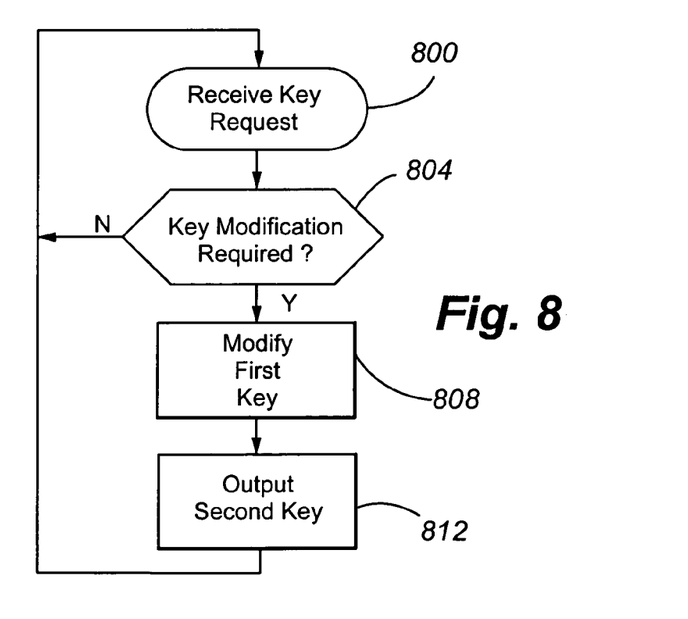
FIG. 8 is a flowchart according to an embodiment of the present invention.

FIG. 8 shows an operational embodiment of the key strength controlling agent 308.

In step 800, the agent 308 receives a key request from another component of the device 300.

In decision diamond 804, the agent 308 determines whether key modification of the first key is required. This determination is made by reviewing the data structure in the license file 312. If not, the agent 308 does nothing and permits the first key to be provided to the requesting component. If so, the agent 308 invokes the key modifier 316.

The key modifier 316, in step 808, modifies the first key to produce the second key.

In step 812, the agent 308 outputs the second key, and not the first key, to the requesting component.

A number of variations and modifications of the invention can be used. It would be possible to provide for some features of the invention without providing others.

For example in one alternative embodiment, the random number generator itself is modified to produce little variation in output when restrictions apply. For example, the generator may select random or pseudo-random numbers for only a subset of the bits in the key. In other words, the number generator is configured so that the possibility of a every bit being changed is not equal. Some bits are more likely to change than others. In another example, the output itself is intentionally not random or only partially random. In other words, the possibility of bit changing is less than a random degree of chance.

In another alternative embodiment, the agent 308 and/or modifier 316 are embodied as software, hardware (e.g., a logic circuit such as an Application Specific Integrated Circuit or ASIC), or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing a cryptographic key, comprising:
    (a) receiving, at a key strength controlling agent, a request for a cryptographic key;
    (b) analyzing, by the key strength controlling agent, a restriction identifier in a license file, the key strength controlling agent and the license file residing on a common communication device;
    (c) thereafter and based on the analyzing step, determining, by the key strength controlling agent, whether the cryptographic key strength is restricted, wherein the restriction identifier is a Global Positioning System (GPS) signal, wherein the GPS signal is received from a GPS module external to the common communication device, wherein the common communication device is inoperable unless the GPS module is plugged in to the common communication device, and wherein the determining step comprises:
        (c1) receiving the GPS signal indicating a spatial location of the GPS module, the GPS signal providing GPS coordinates; and
        (c2) mapping, by the common communication device, the GPS coordinates to a table of GPS coordinates to determine whether the common communication device is currently located in a use-restricted geographic area thereby controlling whether or not cryptographic key strength is restricted, wherein cryptographic key strength is restricted when the common communication device is located in the use-restricted geographic area;
    (d) when the restriction identifier positively identifies that the cryptographic key is restricted, the common communication device generating and using a second cryptographic key having a second key strength; and
    (e) when the restriction identifier does not positively identify that the cryptographic key is restricted, the common communication device generating and using a first cryptographic key having a first key strength, wherein the first key strength is higher than the second key strength, wherein the second cryptographic key is derived from the first cryptographic key when the restriction identifier positively identifies the cryptographic key strength as being restricted, and wherein all bits of the first and second cryptographic keys are kept secret.

2. The method of claim 1, wherein the restriction identifier is a software flag in the license file, wherein the license file controls the flag which, in turn, alters the level of strength of the second cryptographic key.

3. The method of claim 1, wherein the restriction identifier analyzed by the key strength controlling agent comprises a data structure that includes machine code providing instructions for modifying the first cryptographic key to produce the second cryptographic key, wherein the data structure includes a plurality of different codes and each of the plurality of different codes includes instructions for modifying the first cryptographic key in a different way to produce second cryptographic keys of different strengths, and wherein one of the plurality of different codes is selected and used by the common communication device based on a known location of the common communication device.

4. The method of claim 1, wherein the cryptographic key is restricted and wherein step (d) comprises:
   (d1) generating, by a random number generator, the first cryptographic key; and
   (d2) modifying, by a key modifier, the first cryptographic key to produce the second cryptographic key.

5. The method of claim 4, wherein the first and second cryptographic keys have the same key lengths, wherein at least some of the bits in the first and second cryptographic keys are the same, and further comprising:
   (f) at least one of encrypting and decrypting a message using the second cryptographic key when the cryptographic key is restricted and the first cryptographic key when the cryptographic key is not restricted, wherein the same cipher suite is used with the first and second cryptographic keys.

6. The method of claim 4, wherein the modifying step changes at least some of the bits of the first cryptographic key as set forth in a predetermined pattern.

7. A computer readable memory comprising processor executable instructions stored thereon operable to, when executed by a processor, perform the steps of claim 1.

8. A method for providing a cryptographic key, comprising:
   (a) receiving, at a key strength controlling agent, a request for a cryptographic key;
   (b) analyzing, by the key strength controlling agent, a restriction identifier in a license file to determine whether the cryptographic key strength is restricted, the key strength controlling agent and the license file residing on a common communication device, wherein the restriction identifier is a Global Positioning System (GPS) signal, wherein the GPS signal is received from a GPS module external to the common communication device, wherein the common communication device is inoperable unless the GPS module is plugged in to the common communication device, and wherein the determining step comprises:
      (b1) receiving the GPS signal indicating a spatial location of the GPS module, the GPS signal providing GPS coordinates; and
      (b2) mapping, by the common communication device, the GPS coordinates to a table of GPS coordinates to determine whether the common communication device is currently located in a use-restricted geographic area thereby controlling whether or not cryptographic key strength is restricted, wherein cryptographic key strength is restricted when the common communication device is located in the use-restricted geographic area;
   (c) when the restriction identifier positively identifies that the cryptographic key is restricted, the common communication device generating and using a second key, the second key being derived from a first key and having a second key strength; and
   (d) when the restriction identifier does not positively identify that the cryptographic key is restricted, the common communication device generating and using the first key having a first key strength, wherein the first key strength is different from the second key strength.

9. The method of claim 8, wherein the restriction identifier is a software flag in the license file, wherein the license file controls the flag which, in turn, alters the level of strength of the second cryptographic key.

10. The method of claim 8, wherein the restriction identifier analyzed by the key strength controlling agent comprises a data structure that includes machine code providing instructions for modifying the first key to produce the second key, wherein the data structure includes a plurality of different codes and each of the plurality of different codes includes instructions for modifying the first key in a different way to produce second keys of different strengths, and wherein one of the plurality of different codes is selected and used by the common communication device based on a known location of the common communication device.

11. The method of claim 8, wherein the first and second keys have the same key lengths, wherein at least some of the bits in the first and second keys are the same, and further comprising:
   (e) at least one of encrypting and decrypting a message using the second key when the cryptographic key is restricted and the first key when the cryptographic key is not restricted, wherein the same cipher suite is used with the first and second keys.

12. The method of claim 8, wherein the modifying step changes at least some of the bits of the first key as set forth in a predetermined pattern.

13. A computer readable memory comprising processor executable instructions stored thereon operable to, when executed by a processor, perform the steps of claim 8.

14. A communication device, comprising:
   memory and a processor for executing instructions stored in the memory, the memory including a key strength controlling agent operable to, when executed by the processor, (i) receive a request for a cryptographic key; (ii) analyze a restriction identifier in a license file also residing in the memory; (iii) based on the analysis of the restriction identifier, determine whether the cryptographic key strength is restricted; (iv) when the restriction identifier positively identifies that the cryptographic key is restricted, cause the use of a second cryptographic key having a second key strength; and (v) when the restriction identifier does not positively identify that the cryptographic key is restricted, cause the use of a first cryptographic key having a first key strength, wherein the first key strength is higher than the second key strength, wherein the second cryptographic key is derived from the first cryptographic key when the restriction identifier positively identifies the cryptographic key strength as being restricted, and wherein all bits of the first and second cryptographic keys are kept secret, wherein the restriction identifier is a Global Positioning System (GPS) signal, wherein the GPS signal is received from a GPS module external to the communication device, wherein the communication device is inoperable unless the GPS module is plugged in to the communication device, and wherein the agent receives the GPS signal indicating a spatial location of the GPS module, the GPS signal providing GPS coordinates and wherein the agent maps the GPS coordinates to a table of GPS coordinates to determine whether the communication device is currently located in a use-restricted geographic area thereby controlling whether or not cryptographic key strength is restricted, wherein cryptographic key strength is restricted when the cryptographic key is requested from a geographical location outside of a trusted area.

15. The device of claim 14, wherein the restriction identifier is a software flag in the license file, wherein the license file controls the flag which, in turn, alters the level of strength of the second cryptographic key.

16. The device of claim 14, wherein the restriction identifier analyzed by the key strength controlling agent comprises a data structure that includes machine code providing instructions for modifying the first cryptographic key to produce the second cryptographic key, wherein the data structure includes a plurality of different codes and each of the plurality of different codes includes instructions for modifying the first cryptographic key in a different way to produce second cryptographic keys of different strengths, and wherein one of the plurality of different codes is selected and used by the communication device based on a known location of the communication device.

17. The device of claim 14, wherein the cryptographic key is restricted and wherein the second cryptographic key is derived from the first cryptographic key.

18. The device of claim 17, wherein the first and second cryptographic keys have the same key lengths, wherein at least some of the bits in the first and second cryptographic keys are the same, and further comprising a cipher suite to at least one of encrypt and decrypt a message using the second cryptographic key when the cryptographic key is restricted and the first cryptographic key when the cryptographic key is not restricted, wherein the same cipher suite is used with the first and second cryptographic keys.

19. The device of claim 17, wherein the first cryptographic key has first and second sets of bits, wherein the second cryptographic key has third and fourth sets of bits, and wherein the first and third sets of bits are the same but the second and fourth sets of bits are different.

* * * * *